United States Patent
Mochizuki

(10) Patent No.: US 9,475,227 B2
(45) Date of Patent: Oct. 25, 2016

(54) EXTRUSION TYPE COMPRESSIVE GRANULATING APPARATUS FOR PRODUCING GRANULAR EXCRETA TREATING MATERIAL

(71) Applicant: PEPARLET CO., LTD., Shizuoka (JP)

(72) Inventor: Shotaro Mochizuki, Shizuoka (JP)

(73) Assignee: PEPARLET CO., LTD., Shizuoka (JP)

( * ) Notice: Subject to any disclaimer, the term of this patent is extended or adjusted under 35 U.S.C. 154(b) by 164 days.

(21) Appl. No.: 14/299,054

(22) Filed: Jun. 9, 2014

(65) Prior Publication Data

US 2014/0287082 A1 Sep. 25, 2014

Related U.S. Application Data

(63) Continuation of application No. 13/024,358, filed on Feb. 10, 2011, now abandoned.

(30) Foreign Application Priority Data

Feb. 24, 2010 (JP) .................. 2010-39431

(51) Int. Cl.

| | | |
|---|---|---|
| *B29B 9/08* | (2006.01) | |
| *B29C 47/12* | (2006.01) | |
| *A01K 1/015* | (2006.01) | |
| *B01J 2/20* | (2006.01) | |
| *B29B 9/06* | (2006.01) | |
| *B29C 47/00* | (2006.01) | |
| *B29C 47/52* | (2006.01) | |

(52) U.S. Cl.
CPC ............ *B29C 47/12* (2013.01); *A01K 1/0152* (2013.01); *A01K 1/0155* (2013.01); *B01J 2/20* (2013.01); *B29B 9/06* (2013.01); *B29C 47/0066* (2013.01); *B29C 47/522* (2013.01); *B29C 2793/009* (2013.01)

(58) Field of Classification Search
CPC . B29C 47/12; B29C 47/522; B29C 47/0066; B29C 2793/009
USPC .................. 425/311, 313, 331, 376.1, 382 R
See application file for complete search history.

(56) References Cited

U.S. PATENT DOCUMENTS

| | | | | |
|---|---|---|---|---|
| 3,271,821 A | * | 9/1966 | Street ...................... | B29B 9/065 425/313 |
| 4,822,546 A | * | 4/1989 | Lohkamp ................ | B29B 9/065 425/311 |
| 6,375,447 B1 | * | 4/2002 | Zitron ....................... | B01J 2/20 425/331 |

FOREIGN PATENT DOCUMENTS

| | | |
|---|---|---|
| EP | 0 351 473 | 7/1992 |
| JP | 2007-043988 | 2/2007 |
| JP | 2007-174942 | 7/2007 |
| JP | 2008-136454 | 6/2008 |
| JP | 2008-278826 | 11/2008 |
| JP | 2010-252783 | 11/2010 |

\* cited by examiner

*Primary Examiner* — Alison L Hindenlang
*Assistant Examiner* — Thukhanh T Nguyen
(74) *Attorney, Agent, or Firm* — Wenderoth, Lind & Ponack, L.L.P.

(57) ABSTRACT

An extrusion type compressive granulating apparatus is configured to produce granular excreta treating material that has an absorbing property and is formed by extruding and granulating a raw material via granulating holes formed in a table of the apparatus. A space rib is provided at a lower surface of the die table so as to form a gap below the granulating holes. A cutting blade is provided below the gap. The granulating holes each form a compression zone for compressing the raw material, and the gap forms a non-compression zone in which the compressed material swells before being cut by the cutting blade at the outlet of the non-compression zone.

4 Claims, 10 Drawing Sheets

PROPORTIONAL LIMIT OF POWDER HAVING Φ3 AVERAGE

| | 「1」 | 「2」 |
|---|---|---|
| 1 | 45 | 36 |
| 2 | 20 | 35 |
| 3 | 33 | 43 |
| 4 | 13 | 45 |
| 5 | 40 | 44 |
| 6 | 58 | 48 |
| 7 | 33 | 68 |
| 8 | 40 | 13 |
| 9 | 23 | 28 |
| 10 | 28 | 28 |
| 平均 | 33.3 | 38.8 |

(B)

PROPORTIONAL LIMIT OF POWDER HAVING Φ3 AVERAGE

| | 「3」 | 「4」 |
|---|---|---|
| 1 | 150 | 180 |
| 2 | 130 | 170 |
| 3 | 165 | 130 |
| 4 | 220 | 160 |
| 5 | 185 | 210 |
| 6 | 135 | 145 |
| 7 | 155 | 165 |
| 8 | 190 | 235 |
| 9 | 135 | 170 |
| 10 | 150 | 155 |
| 平均 | 161.5 | 172.0 |

PROPORTIONAL LIMIT OF POWDER
HAVING Φ6 AVERAGE

|   | 「1」 | 「2」 |
|---|---|---|
| 1 | 80 | 27 |
| 2 | 35 | 35 |
| 3 | 55 | 65 |
| 4 | 75 | 27 |
| 5 | 75 | 50 |
| 6 | 45 | 30 |
| 7 | 95 | 27 |
| 8 | 45 | 27 |
| 9 | 50 | 40 |
| 10 | 60 | 40 |
| 平均 | 61.5 | 36.8 |

(B)

PROPORTIONAL LIMIT OF POWDER
HAVING Φ6 AVERAGE

|   | 「3」 | 「4」 |
|---|---|---|
| 1 | 180 | 150 |
| 2 | 210 | 175 |
| 3 | 220 | 140 |
| 4 | 165 | 155 |
| 5 | 180 | 170 |
| 6 | 215 | 175 |
| 7 | 310 | 150 |
| 8 | 180 | 160 |
| 9 | 265 | 160 |
| 10 | 180 | 175 |
| 平均 | 210.5 | 161.0 |

Fig. 8
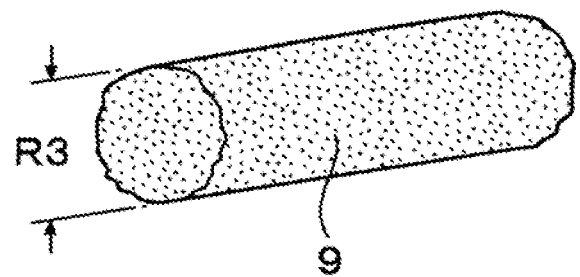
(A)
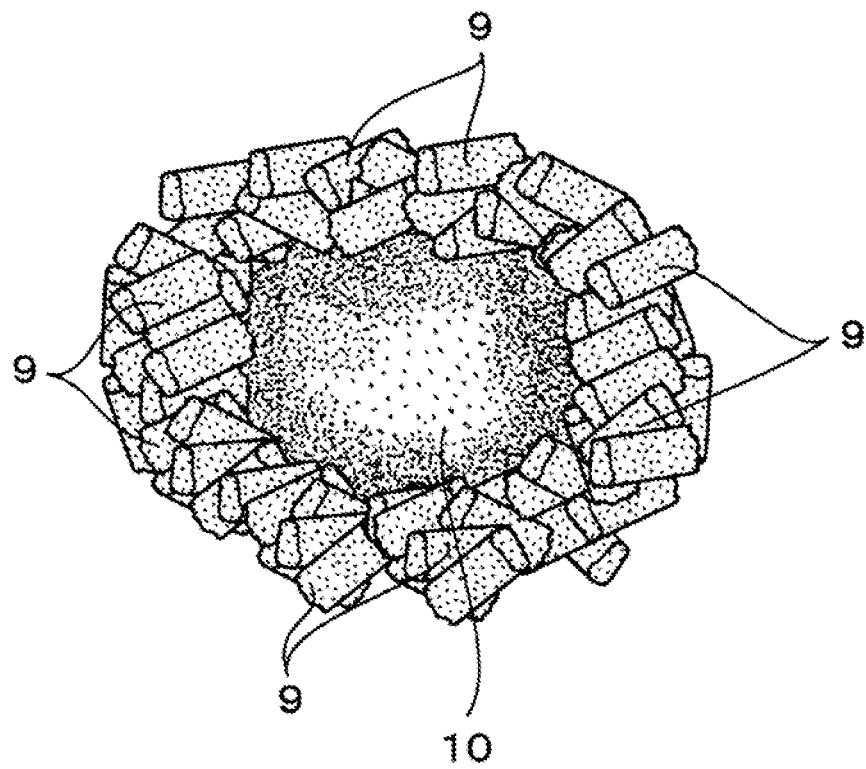
(B)

Fig. 9
(A)
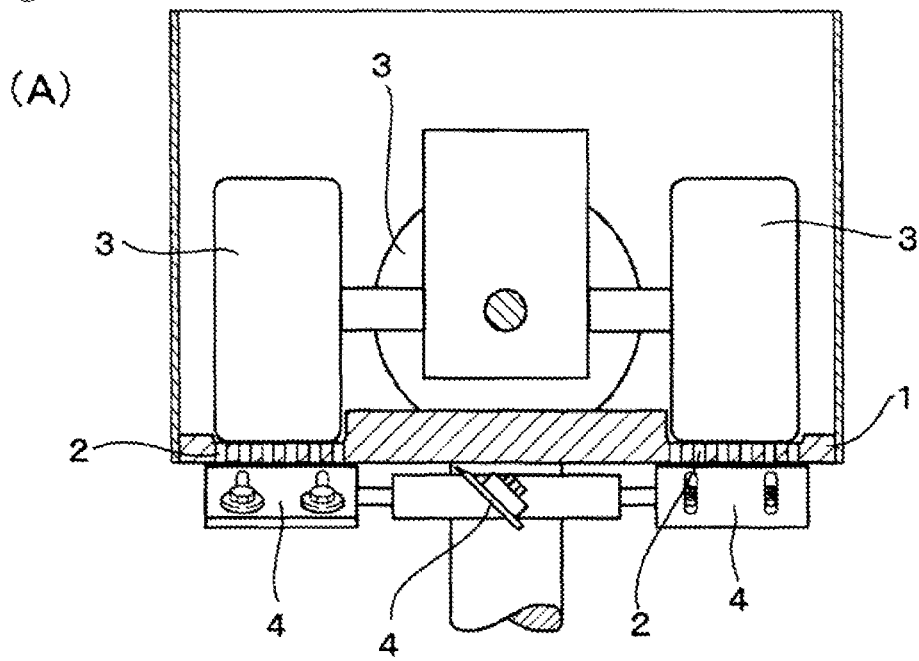
(B)
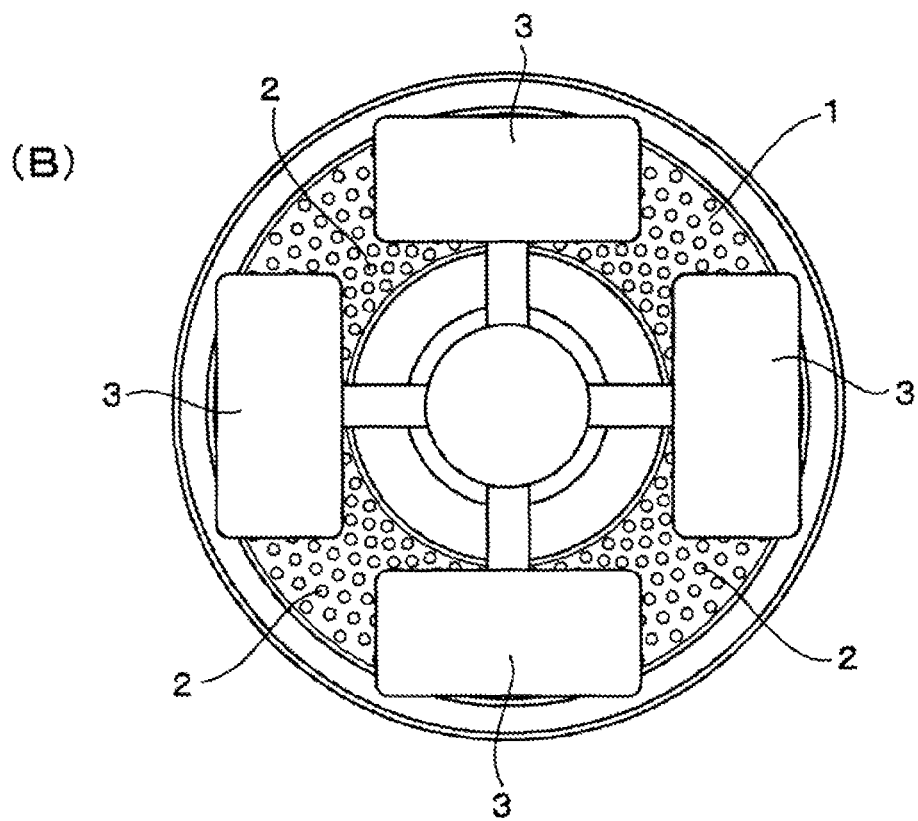

EXTRUSION TYPE COMPRESSIVE GRANULATING APPARATUS FOR PRODUCING GRANULAR EXCRETA TREATING MATERIAL

BACKGROUND OF THE INVENTION

1. Field of the Invention

The present invention relates to an excreta treating material made of absorbent granules mainly containing compressively granulated organic fiber, a production method thereof, and an extrusion type compressive granulating apparatus thereof.

2. Description of the Related Art

Regarding an excreta treating material, it is required that absorbent granules in a urine area are rapidly disintegrated and aggregated after absorbing urine from the viewpoint of the merchantable quality (this aggregation helps a user to determine whether the granules are used or not, and therefore it makes easy for a user to replace the used ones with new granules).

In the past, in order to meet such requirement, a method has been adopted which applies a material formed by mixing a paper powder and starch, CMC, or absorbent polymer onto an outer peripheral surface of an absorbent granule that is compressively granulated under hydration to form a coating layer on the surface, and bonds the adjacent granules to each other by disintegrating the coating layer when absorbing urine so that the granules can be aggregated. However, in this method, there are problems in that manufacturing cost increases due to a manufacturing process necessary to form the absorbent granule as a double structure, and the coating layer is peeled off the coated surface (for example, refer to Japanese Patent Application Laid-Open (JP-A) No. 2008-278826).

On the other hand, as a method of solving a problem of degradation in disintegration and aggregation of the granule without forming the coating layer having the above-described problem, there is known a method which adds oil, wax, or silicon to a raw material mainly containing organic fiber, and kneads and compresses the raw material to be granulated so that the organic fibers may be satisfactorily separated from each other when absorbing urine and are disintegrated and aggregated (for example, refer to JP-A No. 2008-136454).

However, in the above-described method, the featured absorbing property of the excreta treating material may be degraded due to the oil or the like added to the raw material, manufacturing cost may increase due to the use of oil or the like, and a fire is likely to occur during a drying process.

SUMMARY OF THE INVENTION

The invention provides a granular excreta treating material which reliably achieves disintegrability and aggregativeness without covering a granule with a coating layer and adding oil or the like, a production method thereof, and an extrusion type compressive granulating apparatus thereof.

According to the invention, there is provided a granular excret treating material having absorbing property and formed by extruding and granulating a raw material via a granulating hole, wherein the granulating hole includes a small diameter hole and a large diameter hole which are continuous to each other in the axial direction of the hole, the small diameter hole forms a compression zone, and the large diameter hole forms a non-compression zone, and the raw material is compressed at the compression zone, swells at the non-compression zone, and is cut into granules by a cutting blade rotating along an outlet surface of the non-compression zone.

According to the invention, there is provided a granular excreta treating material that has absorbing property and is formed by extruding and granulating a raw material via a granulating hole, wherein a cutting blade is provided with a gap from an outlet surface side of the granulating hole, the granulating hole forms a compression zone, and the gap forms a non-compression zone, and the raw material is compressed at the compression zone, swells at the non-compression zone, and is cut into granules by a cutting blade rotating along an outlet surface of the non-compression zone.

According to the invention, there is provided a method of producing a granular excreta treating material by press-inserting a raw material from an inlet of a granulating hole of an extrusion type compressive granulating apparatus and cutting the raw material extruded from an outlet of the granulating hole into granules by a cutting blade, the method including: forming the granulating hole of which the front stage side forms a compression zone and the rear stage side forms a non-compression zone continuous to the compression zone; installing the cutting blade in a manner such that the cutting blade rotates along an outlet surface of the non-compression zone; compressing the raw material at the compression zone; allowing the raw material to swell at the non-compression zone; and causing the cutting blade to rotate along the outlet surface of the non-compression zone to cut the raw material into granules.

According to the invention, there is provided a method of producing a granular excreta treating material by press-inserting a raw material from an inlet of a granulating hole of an extrusion type compressive granulating apparatus and cutting the raw material extruded from an outlet of the granulating hole into granules by a cutting blade, the method including: installing the cutting blade with a gap from an outlet surface side of the granulating hole; forming a compression zone in the granulating hole; forming a non-compression zone in the gap; compressing the raw material at the compression zone; allowing the raw material to swell at the non-compression zone; and causing the cutting blade to rotate along the outlet surface of the non-compression zone to cut the raw material into granules.

According to the invention, there is provided an extrusion type compressive granulating apparatus for a granular excreta treating material, including: a die table which has a plurality of granulating holes passing through the die table; a pressurizing rotation wheel which press-inserts a raw material into each granulating hole of the die table into granules; and a cutting blade which cuts the raw material extruded from an outlet of each granulating hole of the die table into granules, wherein the front stage side of the granulating hole forms a compression zone and the rear stage side thereof forms a non-compression zone continuous to the compression zone, the cutting blade is provided to rotate along an outlet surface of the non-compression zone, the raw material is compressed at the compression zone, the raw material swells at the non-compression zone, and the cutting blade rotates along the outlet surface of the non-compression zone to cut the raw material into granules.

According to the present invention, there is provided an extrusion type compressive granulating apparatus for a granular excreta treating material, including: a die table which has a plurality of granulating holes passing through the die table; a pressurizing rotation wheel which press-inserts a raw material into each granulating hole of the die table; and a cutting blade which cuts the raw material extruded from an outlet of each granulating hole of the die table into granules, wherein the cutting blade is provided with a gap from an outlet surface side of the granulating hole, a compression zone is formed in the granulating hole, a non-compression zone is formed in the gap, the raw material is compressed at the compression zone, the raw material swells at the non-compression zone, and the cutting blade rotates along the outlet surface of the non-compression zone to cut the raw material into granules.

According to the invention, a cheap granular excreta treating material for pets having satisfactory absorbing property may be provided without forming a coating layer on the outer peripheral surface of the absorbent granule to cause disintegrability and aggregativeness of the granule or adding oil or the like into a raw material mainly containing organic fiber to cause disintegrability and aggregativeness of the granule.

In any invention, the raw material continuously passes through the compression zone that is applied with a pressure and the non-compression zone that is not applied with a pressure, and is cut into granules by the cutting blade. However, the density of the raw material increases due to the pressure applied to the raw material during a time when the raw material passes through the compression zone, but the pressure applied to the raw material is completely released when the raw material arrives at the non-compression zone after passing through the compression zone, so that the raw material swells to become a low-density state, that is, to have a coarse void structure. Accordingly, the absorbing property of the granule remarkably improves, the disintegrability of the granule is promoted when absorbing urine, and accordingly the aggregativeness of the granules is more expected.

BRIEF DESCRIPTION OF THE DRAWINGS

FIGS. 3A and 3B are tables illustrating a result of a breaking load test for a granular excreta treating material having φ3 mm, where FIG. 3A illustrates the first embodiment, and FIG. 3B illustrates the related art;

FIGS. 4A and 4B are tables illustrating a result of a breaking load test for a granular excreta treating material having φ6 mm, where FIG. 4A illustrates the first embodiment, and FIG. 4B illustrates the related art;

FIG. 8A is a perspective view illustrating absorbent granules;

FIG. 8B is a plan view illustrating an aggregated state of the granules;

FIG. 9A is a main cross-sectional view illustrating an extrusion type compressive granulating apparatus according to the related art;

FIG. 9B is a plan view illustrating the extrusion type compressive granulating apparatus.

DESCRIPTION OF THE PREFERRED EMBODIMENTS

Figure 1:
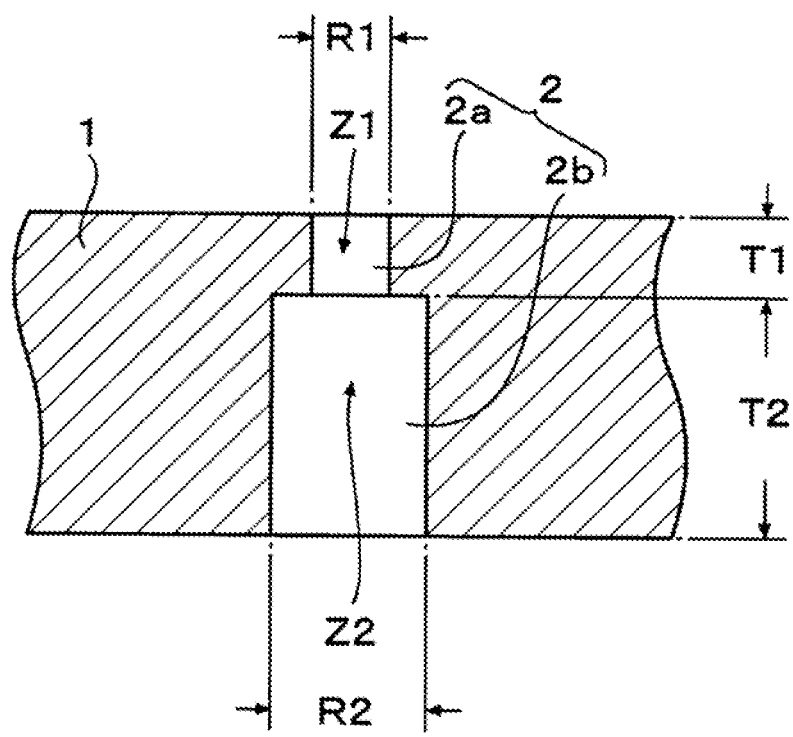
FIG. 1 is a main enlarged cross-sectional view illustrating a shape of a granulating hole according to a first embodiment of the invention.

The invention provides a granular excreta treating material having satisfactory absorbing property, whereby disintegrability and aggregativeness of the granular excreta treating material are expected. The granular excreta treating material has absorbing property and is formed by extruding and granulating a raw material via a granulating hole, wherein the granulating hole includes a small diameter hole and a large diameter hole which are continuous to each other in the axial direction of the hole, in which the small diameter hole forms a compression zone, and the large diameter hole forms a non-compression zone, and in which the raw material is compressed at the compression zone, swells at the non-compression zone, and is cut into granules by a cutting blade rotating along an outlet surface of the non-compression zone.

First Embodiment

Hereinafter, the invention will be described in detail by referring to a first preferred embodiment shown in the accompanying drawings. However, for convenience of description, an extrusion type compressive granulating apparatus for a granular excreta treating material according to the invention will be described first together with a production method thereof.

As shown in FIG. 9, a general extrusion type compressive granulating apparatus includes: a disc-like die table 1 which has a plurality of round compressive granulating holes 2 passing through the die table; a plurality of pressurizing rotation wheels 3 which presses a raw material mainly containing organic fiber into compressive granulating holes 2 of the die table 1; and a cutting blade 4 which cuts the raw material extruded from the outlet of each compressive granulating hole 2 of the die table 1 into granules. A granular excreta treating material having absorbent granules is obtained in a manner such that the raw material is supplied onto the upper surface of the die table 1, the raw material is pressed into each compressive granulating hole 2 while each rotating rotation wheel 3 revolves about the axis of the die table 1, and the raw material extruded into a rod shape from the outlet of each compressive granulating hole 2 is cut into a predetermined length. Further, the die table 1 does not rotate.

Figure 10:
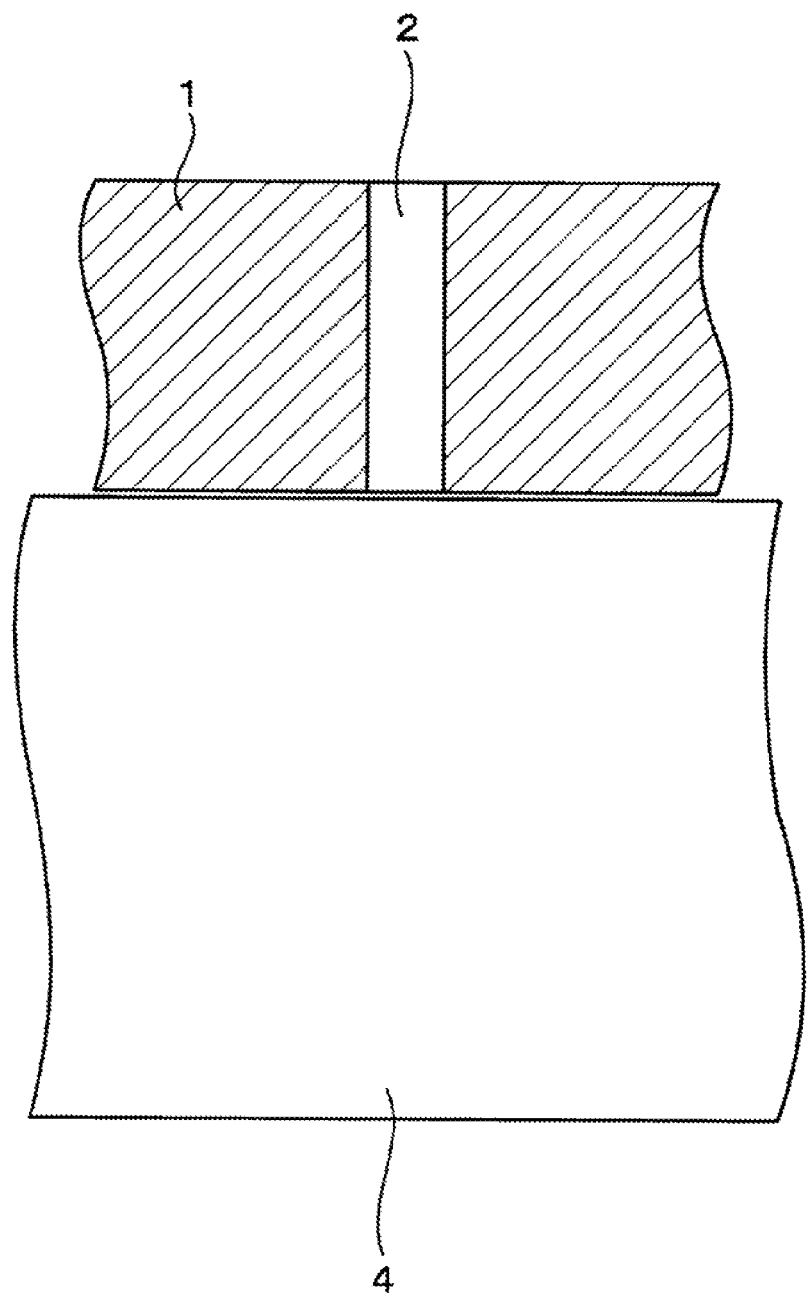
FIG. 10 is a main enlarged cross-sectional view illustrating a shape of a granulating hole according to the related art.

In this case, as shown in FIG. 10, all of the compressive granulating holes 2 passing through the die table 1 are formed to have the same diameter in the axial direction of the hole. Accordingly, the raw material passing the compressive granulating hole 2 out is pressed by a pressure obtained from the inner peripheral surface of the hole as well as a pressure of the pressurizing rotation wheel 3, so that the raw material is continuously compressed inside the compressive granulating hole 2 while it runs from the inlet to the outlet thereof, and then finally extruded.

For this reason, the granule is hardened with high density in the granular excreta treating material of the related art, whereby a urine absorbing property is degraded, and disintegrability and aggregativeness are not expected. In order to make up for this problem, as described in the related art, a method of forming a coating layer on the outer peripheral surface of the granule was adopted.

Figure 6:
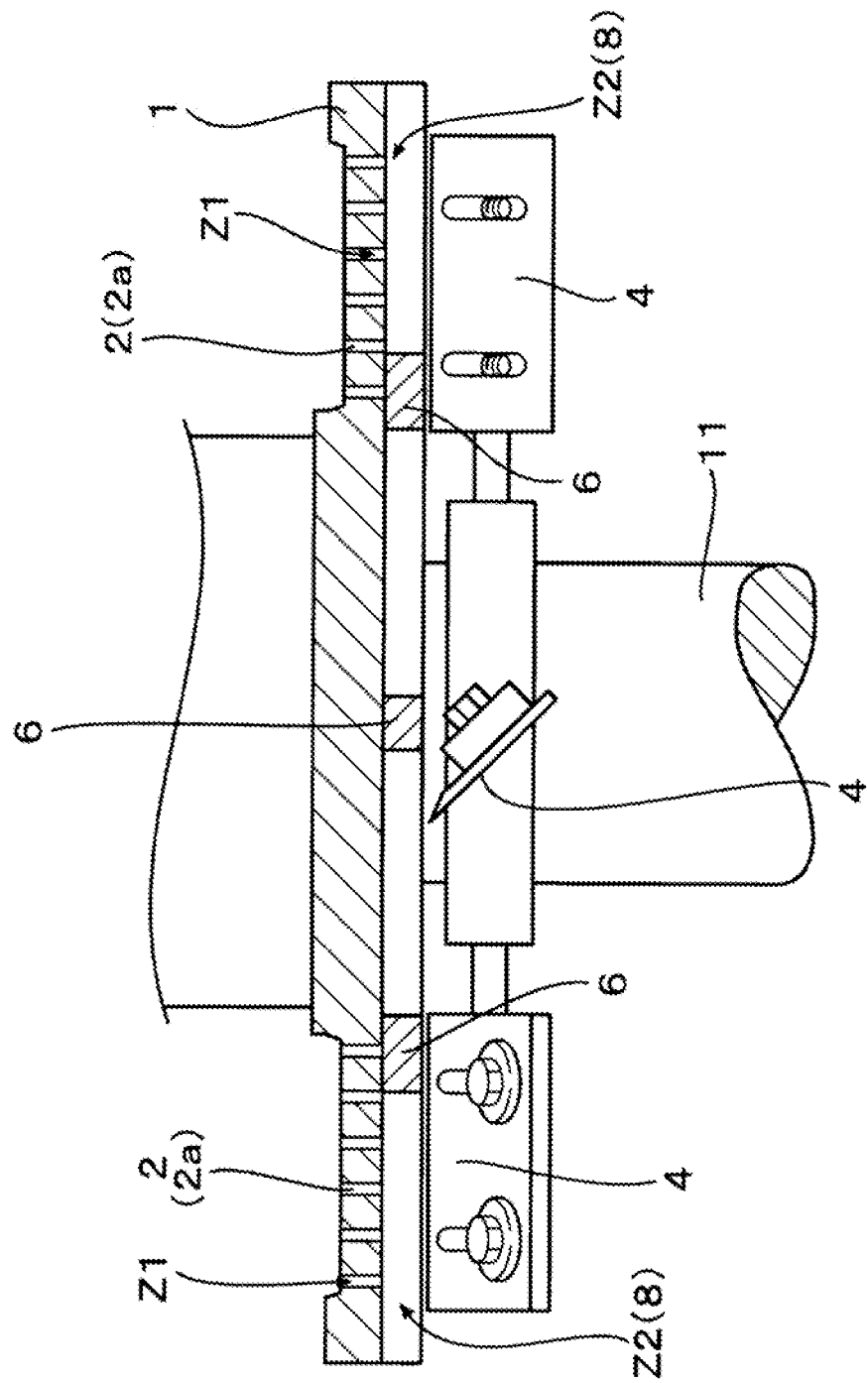
FIG. 6 is a main enlarged cross-sectional view taken along the line A-A of FIG. 5 that shows the extrusion type compressive granulating apparatus according to the second embodiment.

Therefore, in the first embodiment, as shown in FIG. 1, each compressive granulating hole 2 passing through the die table 1 is formed as a double-stage hole structure; the front stage forms a compression zone Z1 having a small diameter hole 2a having the same diameter as the compressive granulating hole 2 of the related art; and the rear stage forms a non-compression zone Z2 having a large diameter hole 2b which is continuous, in the axial direction, from the small diameter hole 2a forming the compression zone Z1 and which has the same axis as the small diameter hole 2a. Right after the raw material passes the compression zone Z1 and the non-compression zone Z2, in other words, the small diameter hole 2a and the large diameter hole 2b, the cutting blade 4 is rotated along the outlet surface of the non-compression zone Z2 to cut the raw material into granules. In this case, the height of the compressive granulating hole 2 composed of the small diameter hole 2a and the large diameter hole 2b is set to be substantially equal to the height of the compressive granulating hole 2 of the related art. When the total thickness of the compressive granulating hole 2 of the related art is 40 mm, the invention has a configuration in which a thickness T1 of the compressive zone Z1, that is, the height of the small diameter hole 2a is set to be in the range from 1 to 10 mm, a thickness T2 of the non-compression zone Z2, that is, the height of the large diameter hole 2b is set to be in the range from 30 to 39 mm, a diameter R1 of the compression zone Z1 is set to be in the range from 2 to 6 mm, and the diameter R2 of the non-compression zone Z2 is set to be in the range from 3 to 8 mm. In addition, as shown in FIG. 6, the cutting blade 4 is attached to a shaft 11 of the compressive granulating apparatus while the cutting blade 4 is disposed to face the outlet surface of the non-compression zone Z2 with a slight gap therebetween or to slide thereon, and the cutting blade is configured to rotate along the outlet surface of the non-compression zone Z2. Further, the blade edge is obliquely inclined with respect to the rotation direction.

Figure 2:
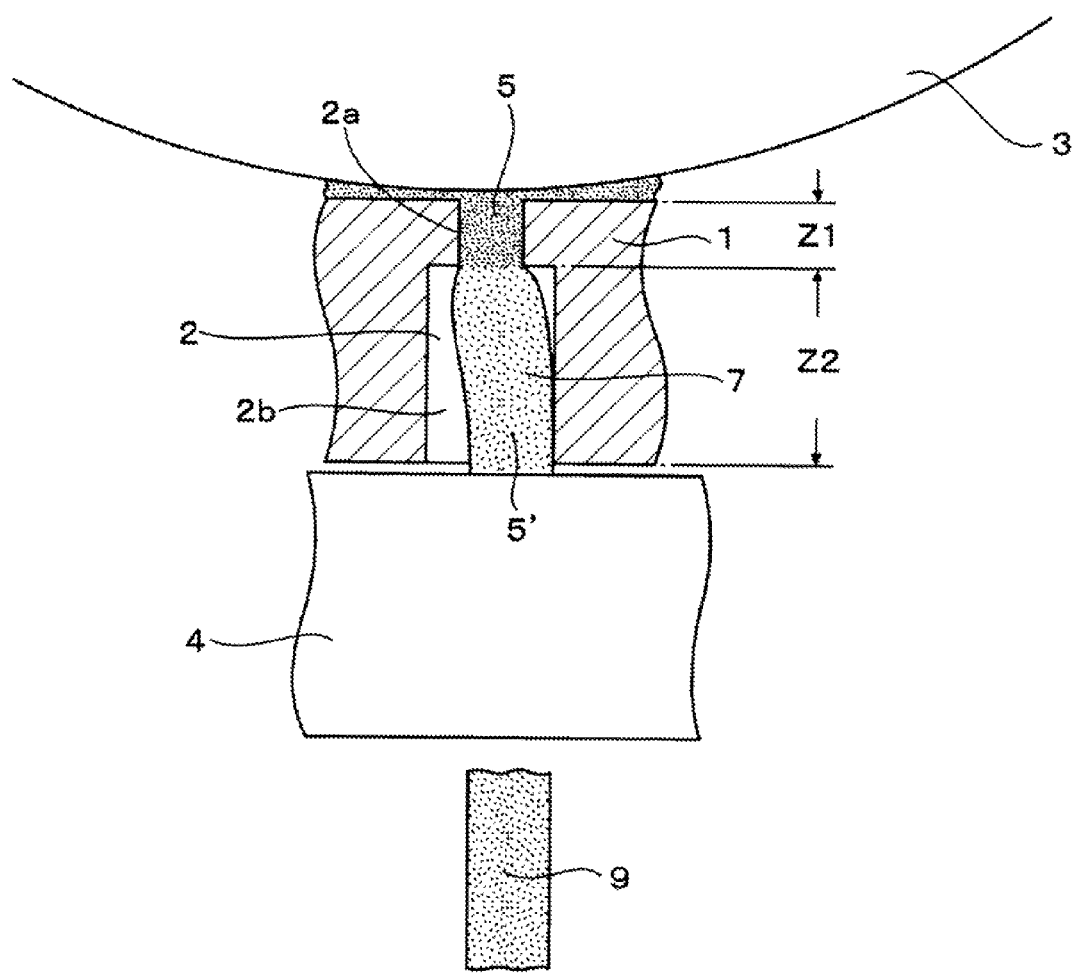
FIG. 2 is a main enlarged cross-sectional view illustrating a state where a raw material passes through a compression zone and a non-compression zone to be granulated in the first embodiment.

Accordingly, the granular excreta treating material produced by the extrusion type compressive granulating apparatus according to the first embodiment continuously passes through the compression zone Z1 that is applied with a pressure and the non-compression zone Z2 that is not applied with a pressure in each compressive granulating hole 2 as shown in FIG. 2, and is cut into granules by the cutting blade 4. The density of the entire raw material becomes comparatively high due to the high pressure applied to the raw material for a short time when the raw material passes through the compression zone Z1, but the pressure applied to the raw material is completely released when the raw material passes through the compression zone Z1 and arrives at the non-compression zone Z2, so that the raw material swells. That is, the raw material is appropriately fastened at the compression zone Z1, and is extruded into a rod shape to go into the non-compression zone Z2. The rod-shaped material 7 extruded into the non-compression zone Z2 is not fastened inside the large diameter hole 2b, but swells for a time when the rod-shaped material passes through the large diameter hole 2b, so that a low-density portion 5' is formed at the free end of the rod-shaped material 7. Granules 9 having a coarse density produced in this manner are restored to be slightly rough as shown in FIG. 8A, so that it comes to have a low-density, that is, a coarse void structure.

Accordingly, the absorbing property improves, and the disintegrability and the aggregativeness are promoted. Further, the reference numeral R3 shown in FIG. 8A indicates 3 mm or 6 mm of diameter.

Since each compressive granulating hole 2 is formed as a double-stage hole structure in the axial direction of the hole, as shown in FIG. 2, the raw material 5 passing through the non-compression zone Z2 is supplied to the cutting blade 4 while its extrusion posture from the compression zone Z1 is regulated by a hole wall defining the non-compression zone Z2, whereby the raw material is appropriately cut by the cutting blade 4 without causing excessive bentness. Further, in the first embodiment, the double-stage hole structure is continuously perforated in one die table 1, but the invention is not limited thereto. For example, a configuration may be adopted in which the die table 1 is formed by two plates, the compression zone Z1 (small diameter hole 2a) is perforated in one plate by drilling, the non-compression zone Z2 (large diameter hole 2b) is perforated in the other plate by drilling, and the plates are laminated. Particularly, in this case, there are advantages in that the hole edge of each plate may be formed at a right angle and one or the other plate may be replaced with a plate having a hole with a different diameter.

In other words, when it is assumed that the granular excreta treating material according to the first embodiment has the same granular shape as that of the related art, the entire granular excreta treating material of the related art is compressed over the entire length of the elongated small diameter hole 2 shown in FIG. 10 to be fastened, but the granular excreta treating material of the first embodiment is compressed at the short small diameter hole 2a in the compression zone Z1 to have necessary hardness, and naturally swells while passing through the non-compression zone Z2 to have a low-density structure (coarse void structure). As a result, the disintegrability of the granules 9 is promoted when absorbing urine and as shown in FIG. 8b, the joining or aggregation 10 of the granules are more expected in accordance with the disintegration.

Further, when the coarse void structure of the granular excreta treating material is represented with a numerical value of a breaking load test, the test results shown in FIGS. 3A, 3B, 4A, and 4B are obtained. That is, in the tables shown in FIGS. 3A and 3B, the absorbent granule 9 is 3 mm in diameter. Regarding "1" and "2" of FIG. 3A, the raw materials having the mixing ratios A and B below are granulated by the compressive granulating apparatus and the production method thereof according to the first embodiment. Regarding "3" and "4" of FIG. 3B, the raw materials having the mixing ratios A and B are granulated by the compressive granulating apparatus and the production method thereof according to the related art. "1" has a condition that the moisture is 8.6% and the die thickness (the height of the compression zone Z1) is 7 mm. "2" has a condition that the moisture is 10.6% and the die thickness is 7 mm. "3" has a condition that the moisture is 9.6% and the die thickness is 40 mm. "4" has a condition that the moisture is 8.9% and the die thickness is 40 mm.

In the tables shown in FIGS. 4A and 4B, the absorbent granule 9 is 6 mm in diameter. Regarding "1" and "2" of FIG. 4A, the raw materials having the mixing ratios A and B are granulated by the compressive granulating apparatus and the production method thereof according to the first embodiment. Regarding "3" and "4" of FIG. 4B, the raw materials having the mixing ratios A and B are granulated by the compressive granulating apparatus and the production method thereof according to the related art. "1" has a condition that the moisture is 10.5% and the die thickness (the height of the compression zone Z1) is 5 mm. "2" has a condition that the moisture is 10.8% and the die thickness is 5 mm. "3" has a condition that the moisture is 7.2% and the die thickness is 40 mm. "4" has a condition that the moisture is 9.3% and the die thickness is 40 mm. Further, the above-described test was conducted by a strength tester (trade name: auto graph manufactured by Shimadsu Corporation.) under the condition that the temperature is about 20° C. and the humidity is about 60%.

According to the test result, in the breaking test of the granular excreta treating material according to the first embodiment, the numerical value of the breaking load N was 95 N or less. The same test was repeatedly conducted, changing the mixing ratio or the diameter of the granule. As a result, it was turned out that satisfactory disintegrability and aggregativeness were obtained with the breaking load of from 13 N to 95 N. On the contrary, in the granular excreta treating material granulated by the method of the related art, all the numerical values of the breaking load were 160 N or more. Therefore, there was found an obvious difference between the invention and the related art.

<Mixing Ratio A> (Ratio by Weight)

| Recycled Paper | from 40% to 55% |
| Inorganic Filling Material | from 30% to 44% |
| Adhesive | from 1% to 30% |

<Mixing Ratio B> (Ratio by Weight)

| Recycled Paper | from 40% to 54% |
| Inorganic Filling Material | from 30% to 44% |
| Adhesive | from 1% to 15% |
| Absorbent Polymer | from 1% to 15% |

Here, the inorganic filling material indicates a material formed by selectively mixing one or more of bentonite, calcium carbonate, talc, acid clay, zeolite, and the like. The adhesive indicates a material formed by selectively mixing starch, CMC, guar gum, and the like.

In the granular excreta treating material according to the invention, a cheap granular excreta treating material having high absorbing property and satisfactory disintegrability and aggregativeness may be provided without using a method of applying a paper powder to the outer peripheral surface of the absorbent granule 9 to form a coating layer thereon or a method of adding oil, wax, or silicon into a mixed material as in the related art. Further, in the first embodiment, the longitudinal compressive granulating apparatus has been described, but the invention is not limited thereto. For example, a transverse compressive granulating apparatus may be arbitrarily adopted.

Second Embodiment

Figure 5:
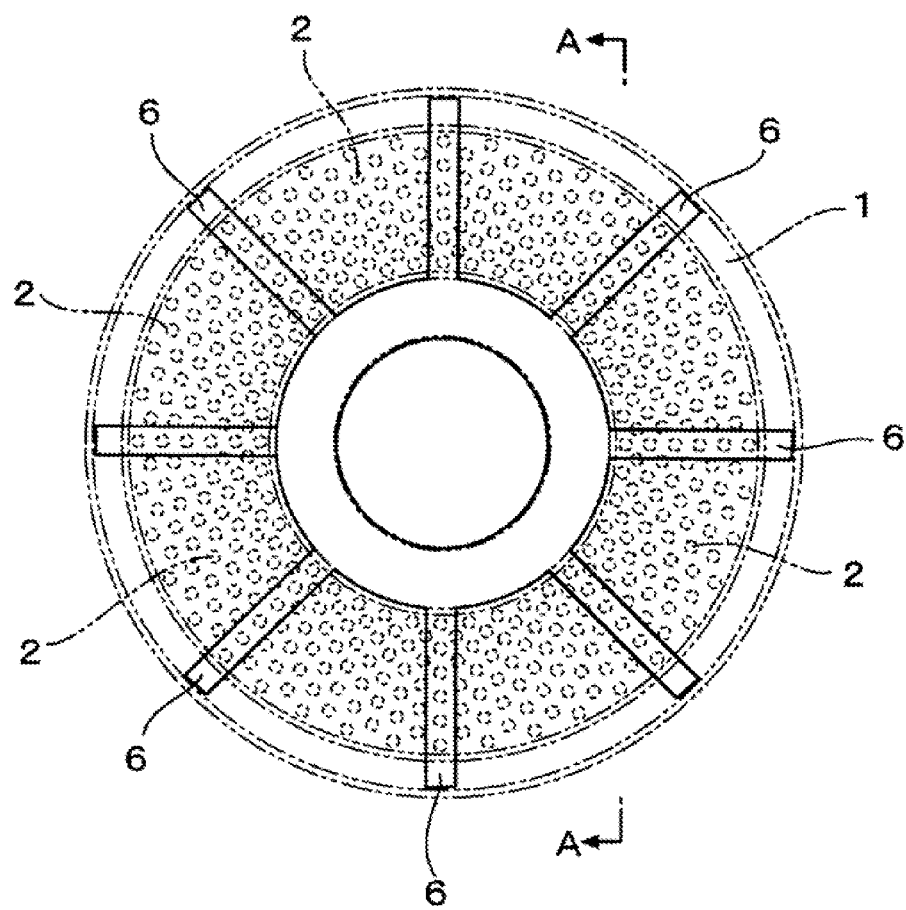
FIG. 5 is a plan view illustrating a die table installed in an extrusion type compressive granulating apparatus according to a second embodiment.

Next, a second embodiment of the invention will be described. The second embodiment is basically similar to the first embodiment except for the configuration below. In the configuration of the first embodiment, the compressive granulating hole 2 is formed as a double-stage hole structure, the front stage forms the compression zone Z1 having the small diameter hole 2a, and the rear stage forms the compression zone Z2 having the large diameter hole 2b. On the contrary, in the configuration of the second embodiment, as shown in FIG. 5, space ribs 6 are disposed on the lower surface of the die table 1 in a radial shape, a circular shape, a square shape, or a protrusion shape, and the non-compression zone Z2 is formed between the space ribs 6.

Figure 7:
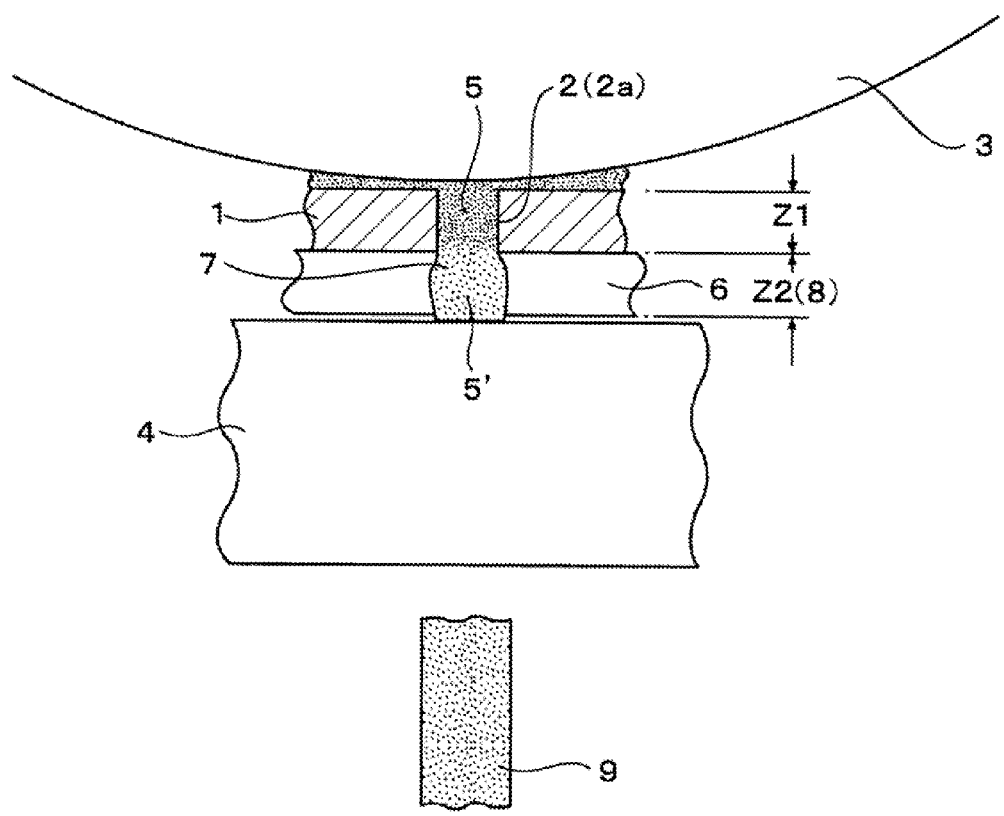
FIG. 7 is a main enlarged cross-sectional view illustrating a state where a raw material passes through a compression zone and a non-compression zone to be granulated in the second embodiment.

That is, as shown in FIGS. 6 and 7, when the raw material is extruded and compressed via the compressive granulating hole 2 to be granulated, the cutting blade 4 is provided with a gap (a gap corresponding to the plate thickness of the space rib 6) 8 at the outlet surface side of the compressive granulating hole 2.

Then, the compression zone Z1 is formed by the compressive granulating hole 2 having the small diameter hole 2a, and the non-compression zone Z2 is formed between the gaps 8. Here, the raw material is compressed by the small diameter hole 2a forming the compression zone Z1, swells at the non-compression zone Z2, and is cut into granules by the cutting blade 4 rotating along the outlet surface of the non-compression zone Z2. Further, the gap 8 is formed in an area defined between the space ribs 6, and the plurality of compressive granulating holes 2 is formed in each area.

In other words, the compressive granulating hole 2 forms the compression zone Z1 having the small diameter hole 2a with the same diameter over the entire height thereof. On the other hand, the cutting blade 4 is provided with a gap corresponding to the plate thickness of the space rib 6 at the outlet surface side of the compressive granulating hole 2, and the non-compression zone Z2 that is open and continuous to the compression zone Z1 having the small diameter hole 2a is formed between the cutting blade 4 and the compressive granulating hole 2.

In this manner, the raw material 5 of the granules 9 passes through both the small-diameter compression zone Z1 and the opened non-compression zone Z2, and is cut by the cutting blade 4 rotating along the outlet surface of the non-compression zone Z2 right after passing bout both zones Z1 and Z2. However, the non-compression zone Z2 mentioned in the second embodiment is not provided to correspond to each compression zone Z1 unlike the first embodiment, and the non-compression zone Z2 is formed to be common to and extending through below all compression zones Z1.

Therefore, even in the second embodiment, the compressive granulating hole (small diameter hole 2a) 2 and the compression zone Z1 are formed, the gap 8 and the non-compression zone Z2 are formed, and the cutting blade 4 is rotated along the outlet surface of the non-compression zone Z2 to cut the raw material into granules right after the raw material passes out both the compression zone Z1 and the non-compression zone Z2.

Accordingly, the granular excreta treating material produced by the extrusion type compressive granulating apparatus according to the second embodiment also continuously passes through the compression zone Z1 that is applied with a pressure and the non-compression zone Z2 that is not applied with a pressure, and is cut into granules by the cutting blade 4. The density of the entire raw material becomes comparatively high due to the high pressure applied to the raw material for a short time while the raw material is passing through the compression zone Z1, but the pressure applied to the raw material is completely released when the raw material passes through the compression zone Z1 and thereby arrives at the non-compression zone Z2, so that the raw material swells. That is, the raw material is appropriately fastened at the compression zone Z1, and is extruded into a rod shape to go into the non-compression zone Z2. The rod-shaped material 7 extruded into the non-compression zone Z2 is not fastened, but naturally swells in the non-compression zone Z2. The granules 9 having a coarse density produced in this manner are restored to be slightly rough, so that it comes to have a low-density structure, that is, a coarse void structure. Accordingly, the absorbing property improves, and the disintegrability and the aggregativeness are promoted.

Further, the production method or the extrusion type compressive granulating apparatus according to the second embodiment are the same as those of the first embodiment except for a method of forming the non-compression zone Z2. Accordingly, the examples of the mixing ratios and the results of the breaking load test shown in FIGS. 3A, 3B, 4A, and 4B based on the examples of the mixing ratios are incorporated herein for reference.

The invention may provide the granular excreta treating material for pets such as a cat or a dog, which has sufficient absorbing property and satisfactory disintegrability and aggregativeness without a coating layer or adding oil or the like. Further, since the granular excreta treating material may be produced at lower cost and fewer process steps compared to the case where a coating is applied onto the surface of the granule, or the case where oil or the like is added, the problem of the related art may be reliably eliminated.

What is claimed is:

1. An extrusion type compressive granulating apparatus for producing granular excreta treating material, the apparatus comprising:
    a die table which has a plurality of granulating holes passing through the die table;
    at least one spacer rib provided on a lower surface of the die table and extending in a radial direction;
    a pressurizing rotation wheel which press-inserts a raw material into each of the granulating holes of the die table; and
    a cutting blade which cuts the raw material, extruded from an outlet of each of the granulating holes of the die table, into granules, wherein
    the cutting blade is positioned relative to the die table to provide a gap corresponding to a plate thickness of the spacer rib at an outlet surface side of the granulating holes,
    each of the granulating holes forms a compression zone, and the gap forms a non-compression zone, and
    the raw material is compressed at the compression zone, swells at the non-compression zone, and is cut into granules by rotating the cutting blade along an outlet surface of the non-compression zone.

2. The extrusion type compressive granulating apparatus for producing granular excreta treating material, according to claim 1, wherein a height of each of the granulating holes is set to 1 to 10 mm, and a thickness of the spacer rib, which forms the gap, is set to 30 to 39 mm.

3. An extrusion type compressive granulating apparatus for producing granular excreta treating material, the apparatus comprising:
    a die table which has a plurality of granulating holes passing through the die table;
    a plurality of spacer ribs provided on a lower surface of the die table, each of the spacer ribs extending in a radial direction;
    a pressurizing rotation wheel which press-inserts a raw material into each of the granulating holes of the die table; and
    a cutting blade which cuts the raw material, extruded from an outlet of each of the granulating holes of the die table, into granules, wherein
    the cutting blade is positioned relative to the die table to provide a gap corresponding to a thickness of the spacer ribs at an outlet surface side of the granulating holes,
    each of the granulating holes forms a compression zone, and the gap forms a non-compression zone, and
    the raw material is compressed at the compression zone, swells at the non-compression zone, and is cut into granules by rotating the cutting blade along an outlet surface of the non-compression zone.

4. The extrusion type compression granulating apparatus for producing granular excreta treating material, according to claim 3, wherein a height of each of the granulating holes is set to 1 to 10 mm, and a thickness of each of the spacer ribs, which form the gap, is set to 30 to 39 mm.

* * * * *